(12) United States Patent
Sailer et al.

(10) Patent No.: US 11,569,648 B2
(45) Date of Patent: Jan. 31, 2023

(54) JOINT-USE BRACKET FOR INSTALLING COMMUNICATION LINES ON UTILITY POLE

(71) Applicant: VAF Industries, LLC, Escondido, CA (US)

(72) Inventors: Glenn Sailer, Escondido, CA (US); Raymond Tai, San Marcos, CA (US)

(73) Assignee: VAF Industries, LLC, Escondido, CA (US)

( * ) Notice: Subject to any disclaimer, the term of this patent is extended or adjusted under 35 U.S.C. 154(b) by 243 days.

(21) Appl. No.: 16/915,998

(22) Filed: Jun. 29, 2020

(65) Prior Publication Data
US 2021/0408777 A1 Dec. 30, 2021

(51) Int. Cl.
*H02G 7/05* (2006.01)
*H02G 1/04* (2006.01)
*H02G 7/20* (2006.01)

(52) U.S. Cl.
CPC ............... *H02G 7/05* (2013.01); *H02G 1/04* (2013.01); *H02G 7/20* (2013.01)

(58) Field of Classification Search
CPC .. H02G 7/05; H02G 1/04; H02G 7/20; H02G 7/205; H02G 7/00; H02G 7/02; H02G 7/06; H02G 7/12
USPC ..... 174/68.1, 68.3, 40 R, 43, 44, 45, 40 CC, 174/88 R, 70 C, 70 A; 248/65, 68.1, 49, 248/74.1, 74.2, 200; 385/134, 135
See application file for complete search history.

(56) References Cited

U.S. PATENT DOCUMENTS

| | | | | | |
|---|---|---|---|---|---|
| 3,752,902 | A | * | 8/1973 | Wilson | H01B 17/145 174/163 F |
| 5,078,347 | A | * | 1/1992 | Sharpe | H02G 1/04 248/59 |
| 5,931,423 | A | * | 8/1999 | Heideloff | F16L 3/2235 248/219.3 |
| 8,596,590 | B2 | * | 12/2013 | McCoy | H02G 3/30 248/68.1 |
| 8,973,766 | B2 | * | 3/2015 | Sprang, Jr. | B60P 7/0823 211/70.6 |
| 10,355,467 | B1 | * | 7/2019 | Conrad | H02G 7/205 |

* cited by examiner

*Primary Examiner* — Timothy J. Dole
(74) *Attorney, Agent, or Firm* — LambentIP

(57) ABSTRACT

A joint-use bracket (JUB) for installing multiple communication lines in a joint-use section on a utility pole is disclosed. The JUB includes a curved plate having a generally rectangular shape elongated in a longitudinal direction and curved along a lateral direction. The curved plate is formed to have one or more attachment holes, one or more slots, and multiple threaded receiving holes. The JUB also has multiple hooks formed contiguous to the front surface of the curved plate, each hook having a threaded through hole, wherein multiple bolts are associated with the multiple hooks, respectively. Each hook is configured to hold a wire or a cable through a D-shaped opening that is formed by the hook and the bolt when the bolt is screwed in through the threaded through hole to have the end portion engaged with the threaded receiving hole.

9 Claims, 7 Drawing Sheets

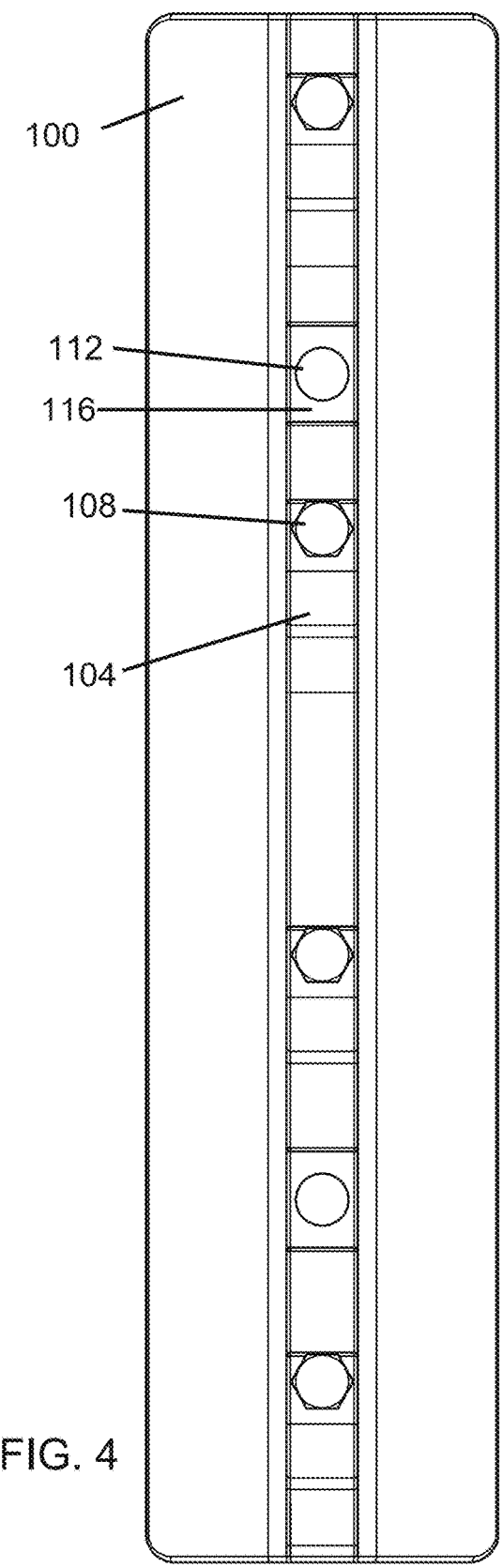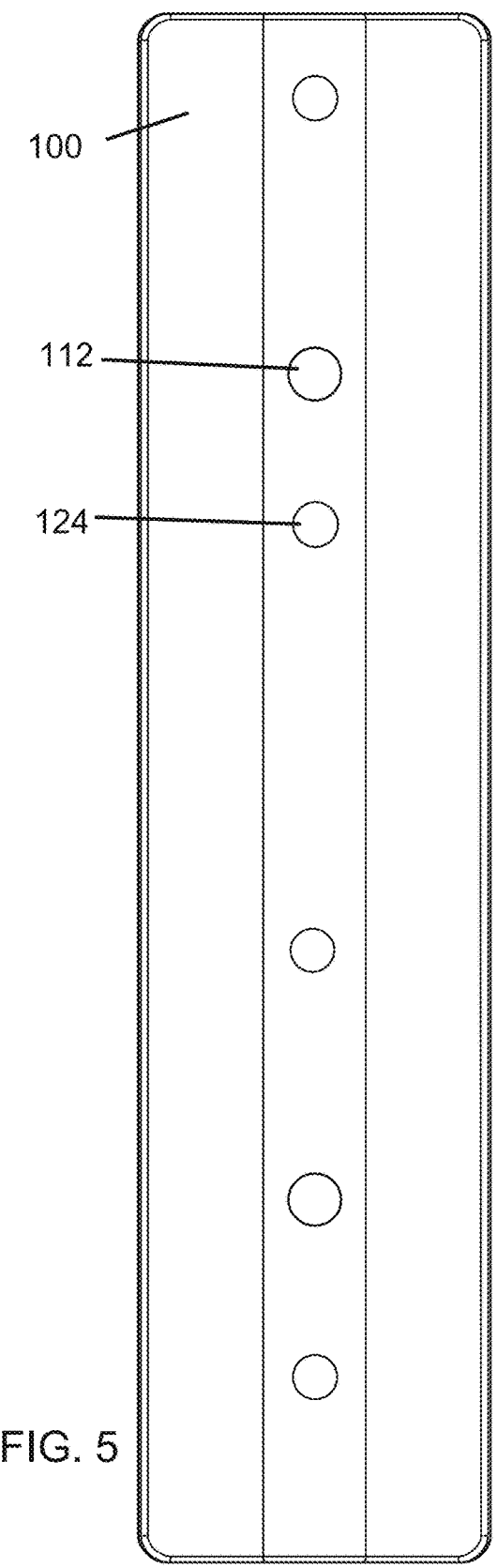
FIG. 4
FIG. 5

JOINT-USE BRACKET FOR INSTALLING COMMUNICATION LINES ON UTILITY POLE

BACKGROUND

A utility pole is used to support power lines, electrical cables, fiber optic cables and related equipment. A standard utility pole in the United States is about 40 ft (12 m) long and is buried about 6 ft (2 m) in the ground, and can be made of wood, metal, concrete, or composites such as fiberglass. The power lines, including wires for power distribution and associated equipment, are typically mounted at the top portion of the pole, where the wires are mounted typically on a horizontal crossarm attached to the pole, and several pieces of power-distribution equipment, e.g., fuse cutouts, a lightning arrestor, a distribution transformer, etc., are mounted near the wires. Below the top portion of the pole designated for power lines, a vertical space along the pole is designated for supporting communication lines, examples of which include copper or fiber optic cables for telecommunication lines, coaxial cables for cable televisions, coaxial or fiber optic cables linking computer networks, etc. Utility poles may also carry other equipment such as streetlights, trolley wires, cellular network antennas, etc. In general, providers of electricity, television, telephone, streetlight, traffic signal and other services share poles, either in joint ownership or by renting space to each other, commonly referred to as "joint use."

A wide variety of pole attachment hardware are provided to secure the cables, wires, and individual pieces of associated equipment to the poles. Examples of these attachment devices include braces, bands, straps, guards, brackets, clamps, hooks, bolts, screws, anchors, etc. Design and implementation of these attachment devices must conform to strict standards and regulations, as compiled, for example, in Telcordia GR-3174, Generic Requirements for Hardware Attachments for Utility Poles, to facilitate reliable physical support, proper directional guiding to accommodate lateral stresses, safe grounding and isolation for electrical parts, and other mechanical and electrical provisions.

To mount an attachment device onto a pole, the pole itself must be configured to receive the attachment device in a secured fashion. For example, holes may be drilled in wood poles to fit the exact hardware needs and requirements. Fasteners such as bolts and screws can be easily applied to wood structures to fasten hardware pieces to wood poles. On the other hand, drilling holes in concrete poles is not feasible. In this case, bands or straps may be used to fasten hardware pieces onto concrete poles on site. Although it is possible to drill holes in steel poles or weld metal objects to steel poles, these processes are not recommended due to potential operational and practical hazards as well as economical disadvantages. Strapping or banding may be a feasible alternative to reliably fasten hardware pieces onto steel poles. Fiber-reinforced composite (FRC) poles can be pre-drilled, or holes can be drilled on-site. However, a certain type of fasteners such as lag bolts, teeth, nails, staples, and the like are unacceptable for FRC poles.

As explained above, mounting pole attachment hardware on already-built poles on-site requires careful considerations with respect to safety, feasibility, labor and cost, depending on the type of equipment to install as well as the type and location of the pole to be used for accommodating the equipment. It should be noted also that adding too many holes and objects to a pole will ultimately lead to structural weakness, a "mess" generated by tangled wires and loose pieces, and other functional and visual degradation. In some areas, the communication companies are making holes in existing poles and installing their communication lines haphazardly, occasionally too close to the power lines, creating a hazard for the power utility. With the advancement of communication technologies, it is expected that more and more providers of the Internet, telephone, and cable TV services will come into play and scramble for the limited space available on utility poles to install their own wires and equipment. In view of the above problems associated with the crowded utility poles with too many wires and equipment pieces, this document describes a new type of pole attachment hardware to reliably install multiple communication lines in an orderly fashion, which will help eliminate the troublesome interference between individual lines and mitigate structural damages to the utility poles.

BRIEF DESCRIPTION OF THE DRAWINGS

FIGS. 3-9 illustrate a perspective view, a front view, a back view, a side view (where the left and right side views are symmetric), a top view, a bottom view, and a perspective view in use, respectively, of an example of the present joint-use bracket.

DETAILED DESCRIPTION

Figure 1:
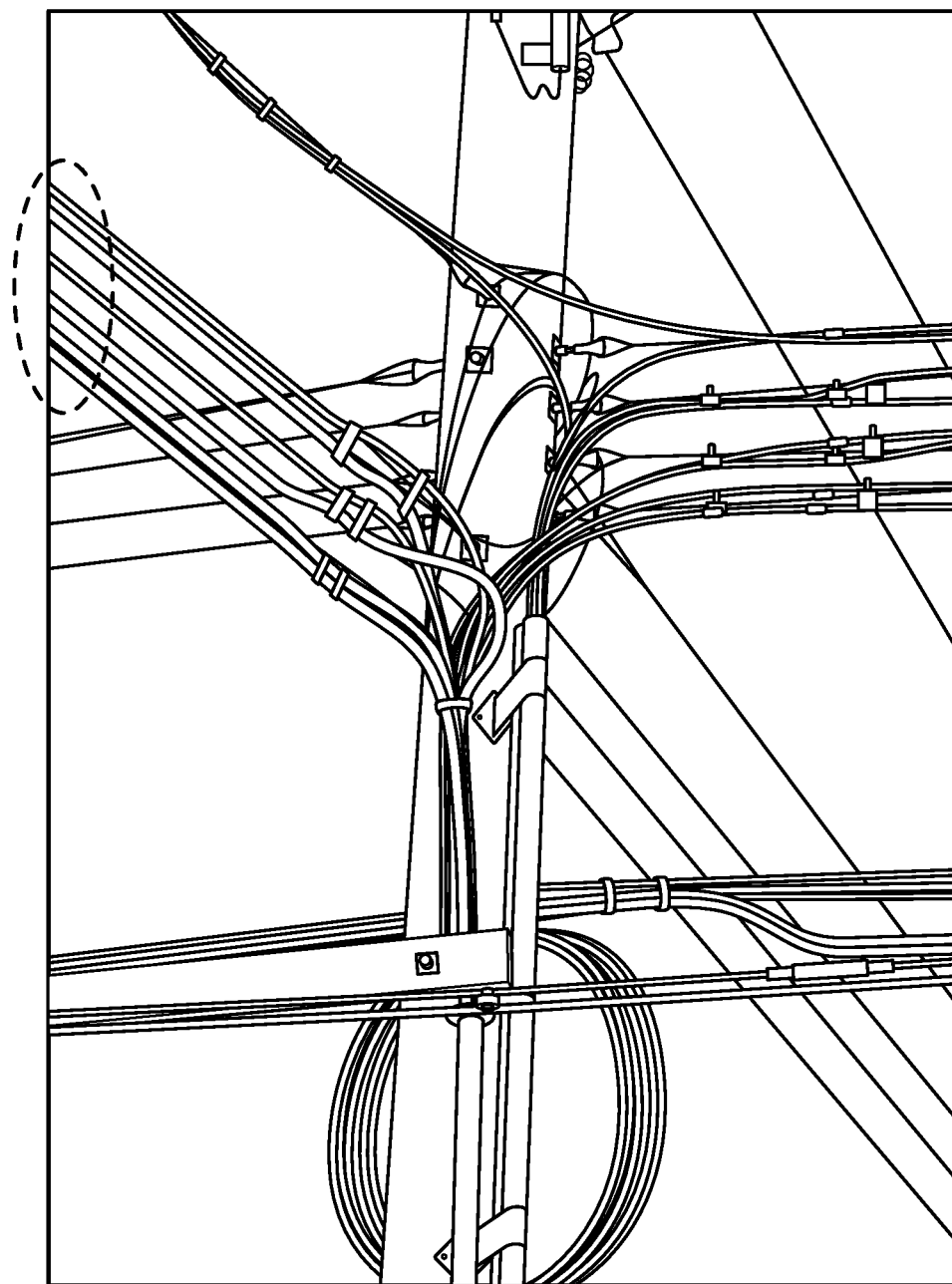
FIG. 1 is a photo showing a typical example of a utility pole installed with many cables, wires, and equipment pieces.

FIG. 1 is a photo showing a typical example of a utility pole installed with many cables, wires, and equipment pieces, the photo especially showing the joint-use section for communication lines. In general, the joint-use section on a utility pole is shared by multiple communication companies (e.g., AT&T, Cox, Frontier, Spectrum, etc.) to provide the telephone, cable TV, Internet, and associated communication services. In the photo of FIG. 1, there are six communication lines, indicated by a circle with broken line, below several guying lines that are used to support and secure the pole and are either attached to a stub (support) pole or an anchor. Each communication line in this section is owned and managed by one specific company, who has installed its own cables and equipment pieces, such as copper or fiber optic cables for telecommunication, coaxial cables for cable TV, coaxial or fiber optic cables linking computer networks, etc. Conventional installation methods include, but not limited to, the use of attachment hardware, such as braces, bands, straps, guards, brackets, clamps, hooks, bolts, screws, anchors, etc.

Figure 2:
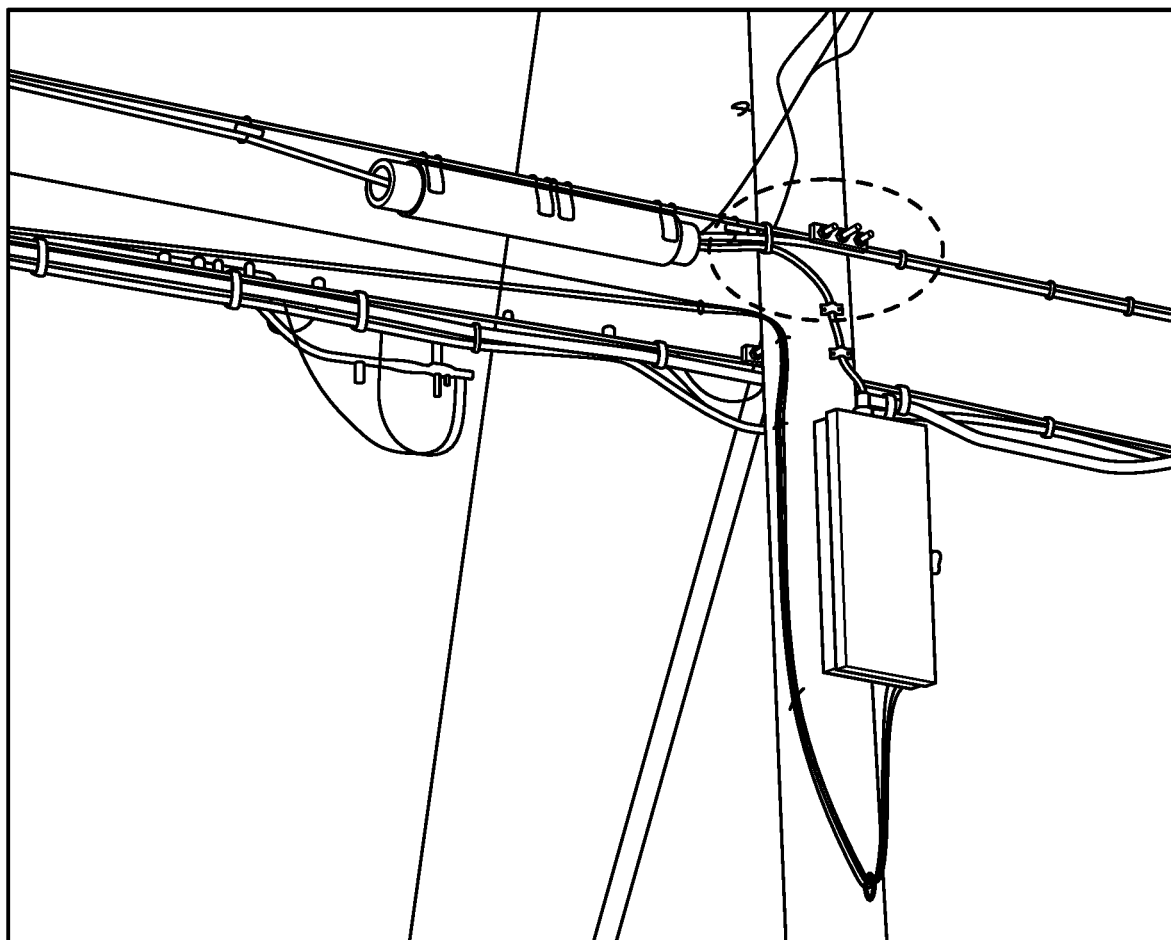
FIG. 2 is a photo showing a typical example of a utility pole where a fiber optic cable and a splice enclosure connected thereto are hanging on a messenger wire that is supported by the attachment hardware attached to the pole.
Figure 3:
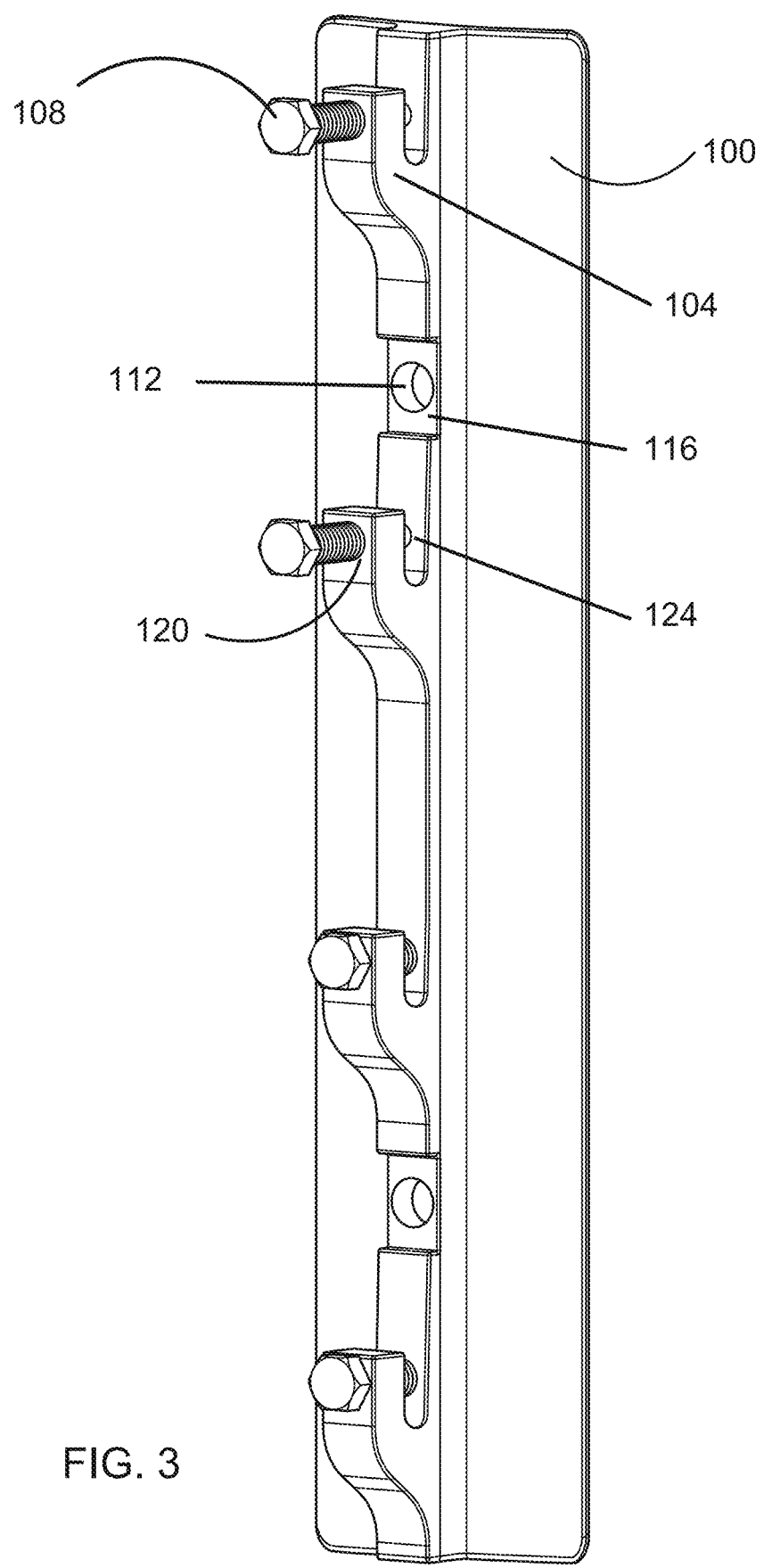
Figure 6:
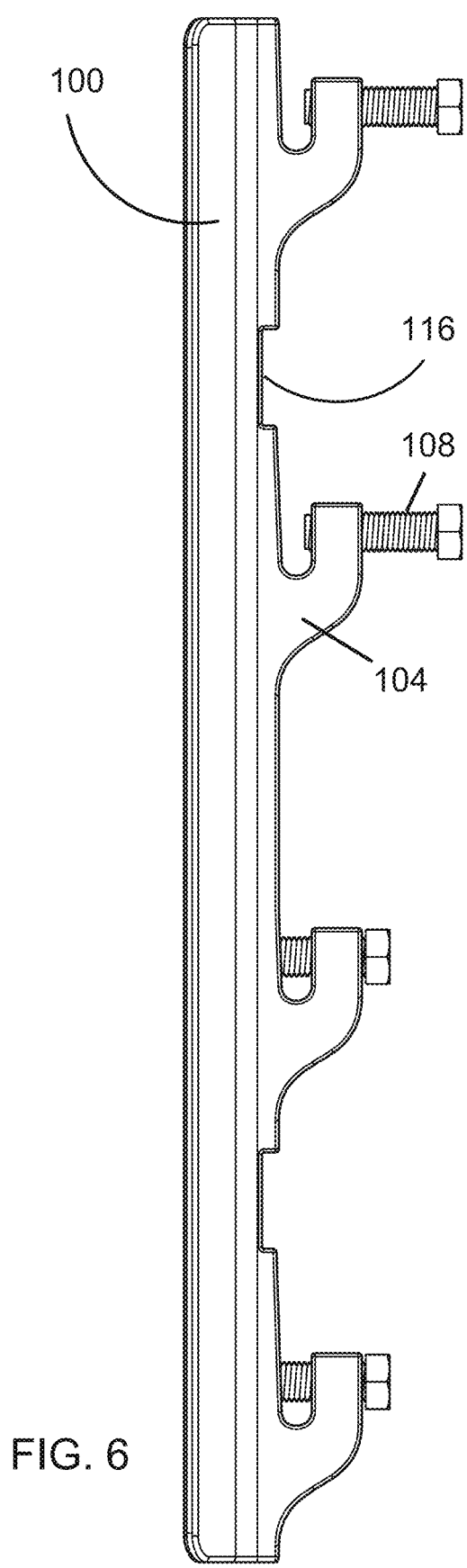
Figure 7:
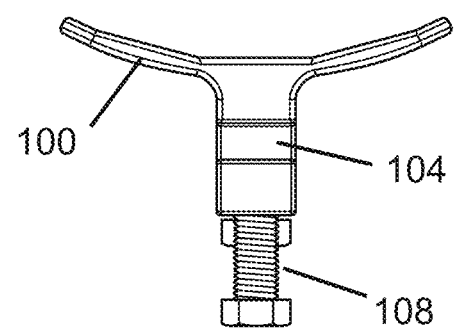
Figure 8:
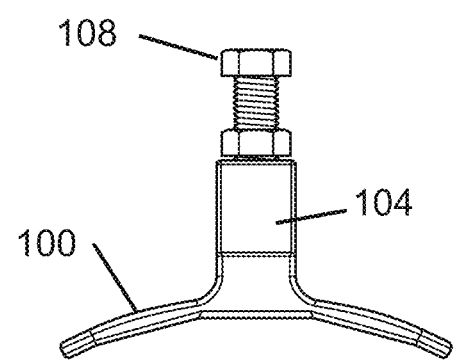

In addition to, or as an alternative to, the conventional installation methods, a fiber optic cable may be installed by using a messenger wire. The messenger wire may be a separate catenary wire to hang the fiber optic cable, or an insulated steel or dielectric wire pre-bundled with the fiber optic cable. FIG. 2 is a photo showing a typical example of a utility pole where a fiber optic cable and a splice enclosure connected thereto are hanging on a messenger wire that is supported by the attachment hardware attached to the pole, as indicated by a circle with broken line.

As seen in the above photos, each communication line is mounted on the pole typically by using an attachment hardware piece bolted or screwed into the pole. With the increase in the number of lines, many more holes are drilled into the pole, which may eventually cause structural degradation and troublesome interference between different lines in proximity. In view of the above problems associated with installing multiple communication lines on a utility poles, this document describes a new type of pole attachment hardware, termed "a joint-use bracket (JUB)" herein, and a new method by using the JUB to reliably install multiple communication lines in an orderly fashion. Details of the structure and mechanism of the present JUB, according to an embodiment, are explained below with reference to FIGS. 3-9, illustrating a perspective view, a front view, a back view, a side view (where the left and right side views are symmetric), a top view, a bottom view, and a perspective view in use, respectively, of an example of the present joint-use bracket (JUB). For the sake of clarity in these figures, where there are a plurality of like parts, only one of them is pointed by a reference number; however, it should be interpreted that the same reference number refers to each of the plurality of like parts.

As illustrated in these figures, the JUB comprises: a curved plate 100, a plurality of hooks 104 contiguously formed thereon, and a plurality of bolts 108 associated with the plurality of hooks 104, respectively. The curved plate 100 is shaped to be generally rectangular, elongated along a longitudinal direction and curved along a lateral direction. The curvature is configured to generally conform to the circumference of a utility pole, which has a generally cylindrical shape and is built vertically upright with the cylindrical axis pointing vertical to the ground. Thus, the curved plate 100 is formed to be installed on the surface of a utility pole, to have its longitudinal direction aligned with the vertically upright pole and have its back surface, which is laterally curved inwardly, placed to cover part of the surface of the cylindrically-shaped pole.

The example of the JUB in FIGS. 3-9 has two attachment holes 112; however, one or more attachment holes 112 may be formed through the curved plate 100 with openings on the front and back surfaces of the curved plate 100. A bolt or a screw can be inserted through the attachment hole 112 to attach the JUB to the utility pole. The number, sizes, and locations of the attachment holes 112 may be determined based primarily on the strength and stability required to support the JUB with multiple wires or cables installed. Each of the attachment holes 112 can be used to insert a screw or a bolt to fasten the curved plated 100 onto the pole surface. One or more slots 116 may be formed on the front surface of the curved plate 100. In this example, two slots 116 are formed laterally around the openings of the two attachment holes 112, respectively, on the front surface of the curved plate 100. Each of the slots 116 can be used to laterally hold a strap, with which the curved plate 100 can be tied to the pole. Thus, based on the present configuration of the attachment holes 112 and the slots 116, one or more straps can be used in addition to, or as an alternative to, one or more screws or bolts to fasten the curved plate 100 onto the pole surface.

The example of the JUB in FIGS. 3-9 has four hooks 104; however, two or more hooks 104 may be contiguously formed on the front surface of the curved plate 100. In this example, the hooks 104 are formed to align with predetermined spacings along the longitudinal direction at the center line of the front surface of the curved plate 100. Each of the hooks 104 is shaped like an upwardly bent finger for holding a wire or a cable, having its proximal end portion formed contiguous to the front surface of the curved plate 100.

A threaded through hole 120 is formed at the distal end portion of each hook 104 to engage with the bolt 108 having a corresponding thread. Two or more threaded receiving holes 124 are formed on the front surface of the curved plate 100, in proximity of the two or more hooks 104, respectively. On the front surface of the curved plate 100, there is a point where the end portion of the bolt 108 reaches when the bolt 108 is screwed in through the threaded through hole 120 of the hook 104. Each threaded receiving hole 124 is formed with the corresponding thread at the point where the end portion of the bolt 108 reaches. Thus, after placing a wire or a cable on the hook 104, the bolt 108 can be screwed in through the threaded through hole 120 to reach the threaded receiving hole 124, with which the end portion of the bolt 108 can be engaged. As a result, a D-shaped opening is provided for securely holding the wire or the cable therethrough. It should be noted that the length of the bolt 108 can be configured so that the end portion of the bolt 108 does not reach the surface of the utility pole. Alternatively, via a manual turning of the bolt 108, the position of the bolt 108 can be adjusted so that the end portion thereof does not screw into the pole. Yet alternatively, the threaded receiving holes 124 can be made to have openings only on the front surface of the curved plate 100, so as to stop the end portion of the bolt 108 in the curved plate 100 instead of penetrating therethrough. In any case, the dimensions and hardness of the bolts 108 as well as the threaded receiving holes 124 may be configured to prevent the end portion of each bolt 108 from damaging the pole surface.

Figure 9:
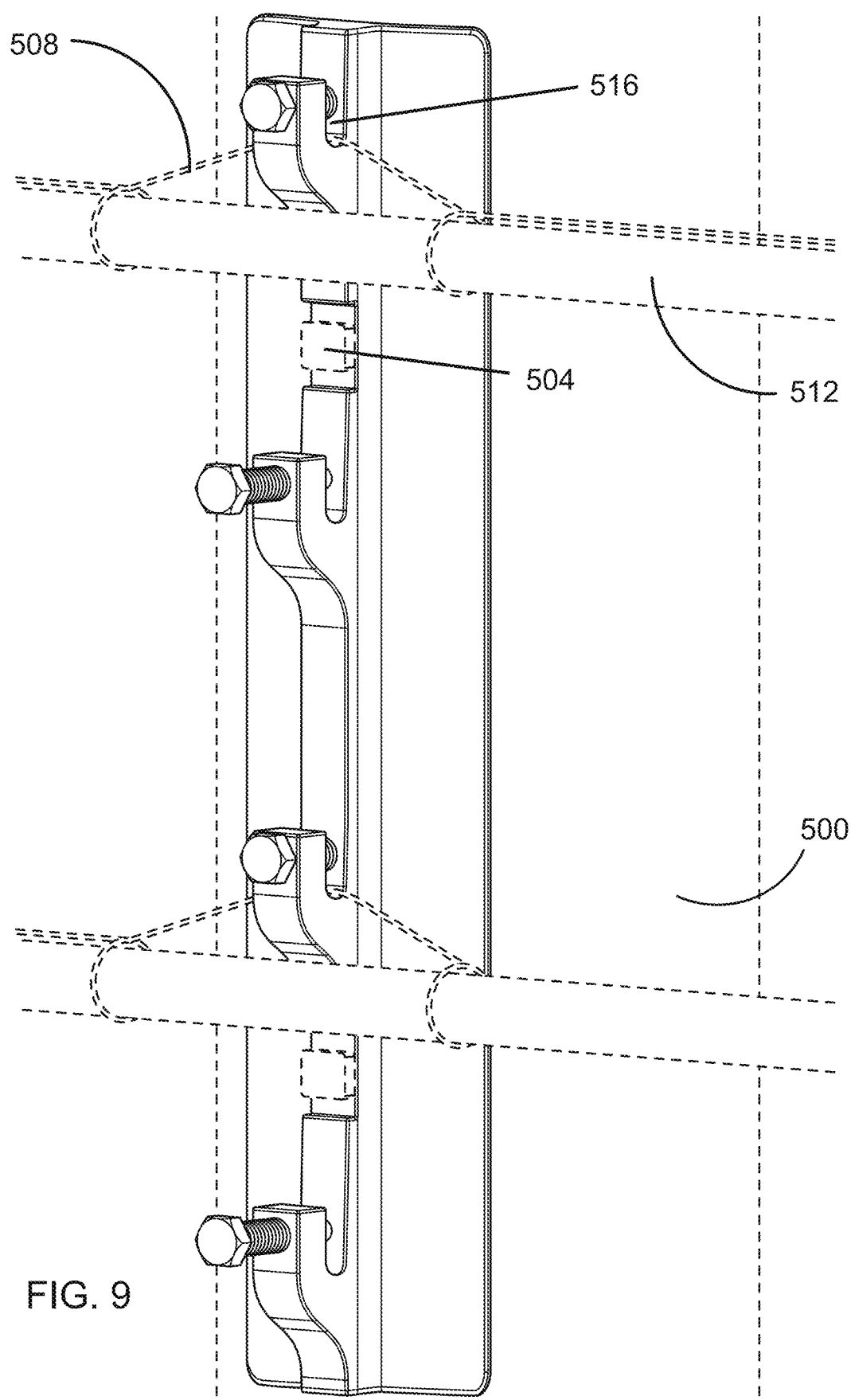

FIG. 9 is a perspective view of the JUB in use. In this example, the JUB is fastened to the pole 500 by two square-head screws 504, which are inserted through the attachment holes 112, respectively, and screwed into the pole 500. Two messenger wires 508 for two fiber optic cables 512 are placed on two of the hooks 104 of the JUB, respectively. Here, each messenger wire 508 is held through the D-shaped opening 516 formed by the hook 104 and the screwed-in bolt 108. As a result, the two fiber optic cables 512 associated with two communication lines are installed on the pole 500; each fiber optic cable 512 is hanging on the messenger wire 508 that is supported by the JUB attached to the pole 500.

Figure 10:
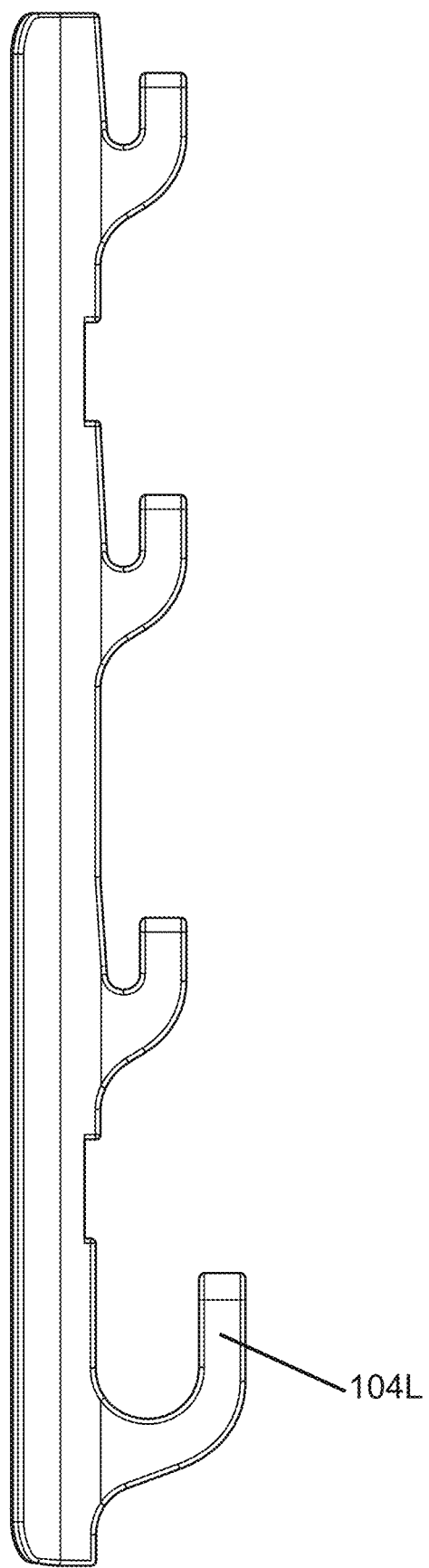
FIG. 10 illustrates a side view of an example variation of the present joint-use bracket.

The number, sizes, and locations of the hooks 104, as well as the spacings in between, may be determined based primarily on the strength and stability required to support multiple wires or cables to be installed. FIG. 10 illustrates a side view of an example variation of the JUB. In this example, the lowest hook 104L is configured to have a shape of a bent finger longer than the other hooks, thereby providing the D-shaped opening larger than the others. The spacings between the hooks are also adjusted. Together, the present variation is designed to provide the stability to hold a larger wire or cable on the lowest hook 104L. This and other variations in the JUB design are possible, depending on the strength and stability requirements to support multiple wires or cables to be installed, which are often of different types and sizes.

Referring back to FIGS. 1 and 2, the conventional attachment hardware is typically designed to support one wire or cable; thus, multiple pieces of attachment hardware are required to be individually attached to the pole by drilling holes to fasten them with bolts or screws. On the other hand, the JUB is capable of supporting two or more wires or cables collectively in an orderly fashion, thereby mitigating the crowding of the joint use section of a utility pole. Further-more, the number of screws or bolts through the attachment holes 112 used for fastening the JUB to the pole can be less than the number of wires or cables to be installed; therefore, the damage to the pole due to the fastening of screws or bolts becomes less than the case of using multiple pieces of conventional attachment hardware for individually installing multiple wires or cables. If one JUB fills up, another JUB can be attached to the pole to install more wires or cables.

As illustrated in FIGS. 3-9, the JUB in this example has two slots 116 formed around the openings of the one or more attachment holes 112, respectively, on the front surface of the curved plate 100. Each of the slots 116 can be used to laterally hold a strap, with which the curved plate 100 can be tied to the pole. In the example use illustrated in FIG. 9, the JUB is fastened to the pole 500 by two square-head screws 504 inserted through two attachment holes 112, respectively, and screwed into the pole 500. However, a strap may be used as an alternative to, or in addition to, the square-head screw 504 for enforcing the stability. As mentioned earlier, it is generally not possible nor recommended to drill holes into a concrete pole or a steel pole. The present JUB includes the slots 116, enabling the use of straps as a fastening means where the use of screws or bolts is prohibitive.

The JUB may be manufactured by using, for example, an aluminum molding technique to form the curved plate 100 and the plurality of hooks 104 contiguous thereto, and adding the plurality of bolts 108 with the thread corresponding to the threaded through holes 120 and the threaded receiving holes 124. The curved plate 100 made of metal naturally provides a protective covering over the surface of the pole, further mitigating the degradation of the pole surface.

Thus, according to an embodiment, the use of the JUB gives rise to a new method of installing a plurality of communication lines in a joint-use section on a utility pole, which is generally cylindrically shaped and built vertically upright, First, the JUB is attached on a surface of the utility pole by placing the curved plate 100 to have the longitudinal direction aligned with the vertically upright direction and have the back surface covering part of the surface of the utility pole, the back surface being laterally curved inwardly with a curvature configured to generally conform to a circumference of the utility pole. Here, the attachment can be carried out by: using one or more attachment holes 112 formed through the curved plate 100 to insert one or more bolts or screws therethrough, respectively, to fasten the curved plate 100 to the utility pole; using one or more slots 116 formed on the front surface of the curved plate 100 to laterally hold one or more straps, respectively, to tie the curved plate 100 onto the utility pole; or a combination of the above. Second, a wire or a cable associated with each of the communication lines is placed on one of the plurality of hooks 104. Third, the bolt 108 is screwed in through the threaded through hole 120 of the hook 104 to have the end portion of the bolt 108 engaged with the threaded receiving hole 124 formed on the front surface of the curved plate 100 at a point where the end portion of the bolt 108 reaches. Here, a D-shaped opening is formed by the hook 104 and the screwed-in bolt 108 to securely hold the wire or the cable therethrough. This completes the installation.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A joint-use bracket for use for installing a plurality of communication lines in a joint-use section on a utility pole, which is generally cylindrically shaped and built vertically upright, the joint-use bracket comprising:
    a curved plate having a generally rectangular shape elongated in a longitudinal direction and curved along a lateral direction with a curvature configured to generally conform to a circumference of the utility pole, the curved plate being formed to have one or more attachment holes therethrough with openings on a front surface and a back surface thereof, to have one or more slots on the front surface, and to have a plurality of threaded receiving holes;
    a plurality of hooks, each of which includes a proximal end portion formed contiguous to the front surface of the curved plate and a distal end portion having a threaded through hole formed therethrough; and
    a plurality of bolts associated with the plurality of hooks, respectively, each of the plurality of bolts being configured to engage with the threaded through hole of the hook and including an end portion configured to engage with one of the plurality of threaded receiving holes, wherein the threaded receiving hole is formed at a point on the front surface where the end portion of the bolt reaches when the bolt is screwed in through the threaded through hole of the hook.

2. The joint-use bracket of claim 1, wherein
    the plurality of hooks are formed to align with predetermined spacings along the longitudinal direction at a center line of the front surface, each of the plurality of hooks having a shape of a generally upwardly bent finger.

3. The joint-use bracket of claim 1, wherein
    each of the plurality of hooks is configured to hold a wire or a cable through a D-shaped opening that is formed by the hook and the bolt when the bolt is screwed in through the threaded through hole of the hook to have the end portion engaged with the threaded receiving hole formed at the point on the front surface.

4. The joint-use bracket of claim 1, wherein
    the number, sizes, and locations of the hooks and spacings therebetween are configured based on strength and stability required to support a plurality of wires or cables to be installed.

5. The joint-use bracket of claim 1, wherein
    each of the one or more attachment holes formed through the curved plate is configured for inserting a screw or a bolt to fasten the curved plate to the utility pole.

6. The joint-use bracket of claim 1, wherein
    each of the one or more slots is configured for laterally holding a strap, with which the curved plate is tied onto the utility pole.

7. The joint-use bracket of claim 1, wherein
    the one or more slots are laterally formed around the openings of the one or more attachment holes, respectively, on the front surface.

8. A method of installing a plurality of communication lines in a joint-use section on a utility pole, which is generally cylindrically shaped and built vertically upright, by using the joint-use bracket of claim 1, the method comprising:
  attaching the joint-use bracket on a surface of the utility pole by placing the curved plate to have the longitudinal direction aligned with the vertically upright direction and have the back surface covering part of the surface of the utility pole, the back surface being laterally curved inwardly with a curvature configured to generally conform to a circumference of the utility pole;
  placing a wire or a cable associated with each of the communication lines on one of the plurality of hooks; and
  screwing in the bolt associated with the hook through the threaded through hole of the hook to have the end portion of the bolt engaged with the threaded receiving hole formed on the front surface of the curved plate at a point where the end portion of the bolt reaches, wherein a D-shaped opening is formed by the hook and the screwed-in bolt to hold the wire or the cable therethrough.

9. The method of claim 8, wherein the attaching comprises:
  using one or more attachment holes formed through the curved plate to insert one or more bolts or screws therethrough, respectively, to fasten the curved plate to the utility pole;
  using one or more slots formed on the front surface of the curved plate to laterally hold one or more straps, respectively, to tie the curved plate onto the utility pole; or
  a combination of the above.

* * * * *